Jan. 14, 1930. C. L. BASTIAN 1,743,651
ICE CREAM REFRIGERATOR
Filed Dec. 29, 1927
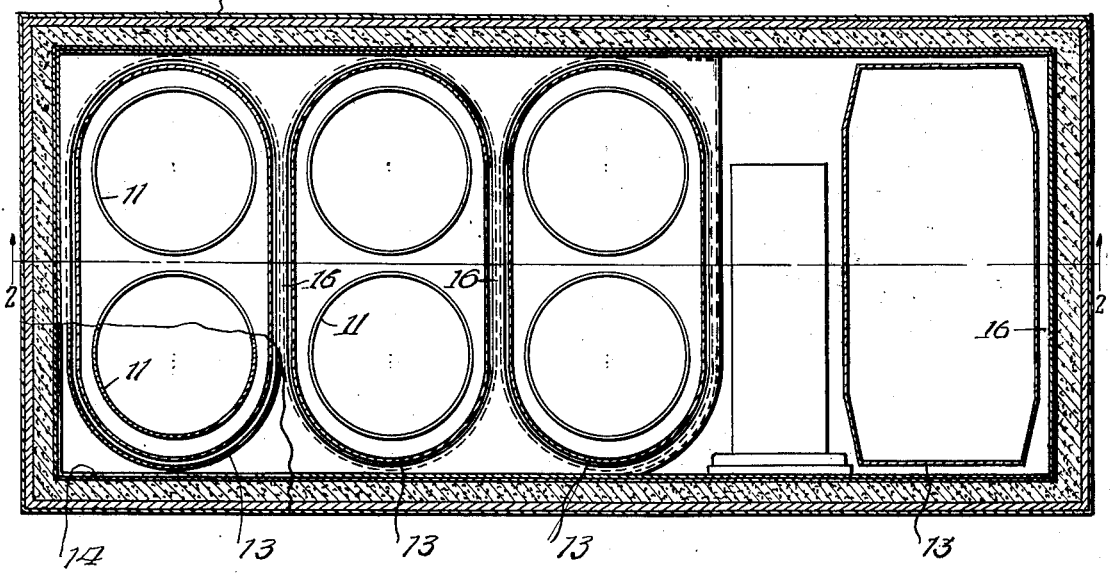
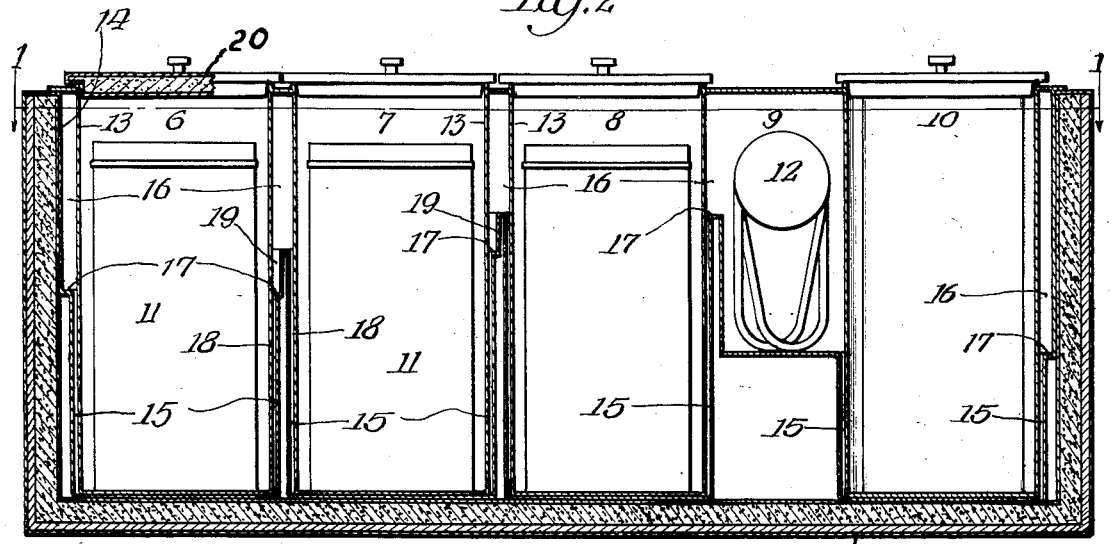
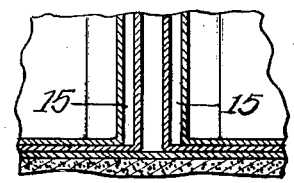
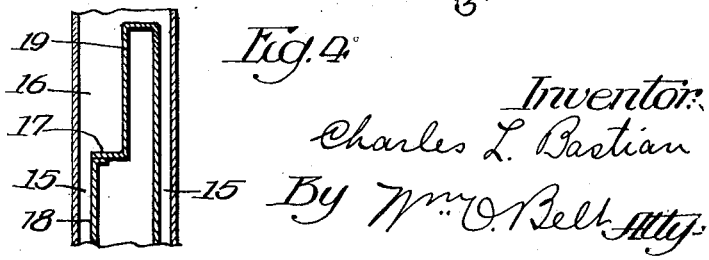

Patented Jan. 14, 1930

1,743,651

UNITED STATES PATENT OFFICE

CHARLES L. BASTIAN, OF CHICAGO, ILLINOIS, ASSIGNOR TO THE BASTIAN-BLESSING COMPANY, OF CHICAGO, ILLINOIS, A CORPORATION OF ILLINOIS

ICE-CREAM REFRIGERATOR

Application filed December 29, 1927. Serial No. 243,222.

This invention relates to ice cream refrigerators and its object is, primarily, to provide efficient and uniform refrigeration for a plurality of cans of ice cream in the refrigerator regardless of their location with respect to the refrigerating boiler.

Another object of the invention is to increase the volume of refrigerating medium acting upon the cans in proportion to the distance of the cans from the refrigerating boiler and to the degree of temperature of the refrigerating medium so that a greater volume of refrigerating medium will be provided for the farthest can than for the nearest can, whereby to provide an efficient and uniform refrigeration for all of the ice cream in the refrigerator.

And a further object is to provide a relative large volume of refrigerating medium about the upper portion and a smaller volume about the lower portion of each can to maintain the ice cream in a desired refrigerating condition.

In the accompanying drawings I have illustrated a selected embodiment of the invention wherein, Fig. 1 is a horizontal sectional view of a refrigerator for ice cream embodying the invention and taken on the line 1—1 of Fig. 2, one corner being broken away to show the structure near the bottom of the compartment.

Fig. 2 is a vertical sectional view on the line 2—2 of Fig. 1.

Figs. 3 and 4 are detail sectional views.

Referring to the drawings 5 designates a heat insulated receptacle of any suitable construction which can be used separate or in conjunction with a more elaborate refrigerating cabinet or a soda fountain or a counter cabinet, and it may be constructed in any desired size and shape and of any suitable materials, the walls being heat insulated by the use of a cork filling or other material and in any manner well known in the art or suitable for the purpose.

A casing in the receptacle has inside walls 13 and outside walls 14, the inside walls forming a plurality of compartments which may be disposed in any manner suitable and convenient for particular installations. In the drawing I have shown a construction and arrangement which has been found desirable and which comprises three bulk ice cream compartments 6, 7 and 8, a refrigerating boiler compartment 9 and an ice cream brick compartment 10, these compartments being arranged side by side in the order named and extending from end to end of the receptacle. The compartments 6, 7 and 8 may be made in any suitable shape to receive the bulk ice cream cans 11, 11 and so also may the compartments 9 and 10 to accommodate the refrigerating boiler 12 and ice cream bricks respectively.

The compartments are spaced from each other and the casing is supplied with a refrigerating medium, such as brine, which is maintained at a low temperature by the refrigerating boiler 12, or other suitable means. Provision is made for a greater volume of brine about the farthest compartment 6 than about the next compartment 7, and more about the compartment 7 than about the compartment 8, the variation in volume being proportioned to the distance of the compartment from the boiler and the temperature of the brine so that the volume of brine acting upon the compartments increases with the distance of a compartment from the boiler.

The brine is confined in a narrow space 15 around the lower portion of each compartment and in a larger space 16 around the upper portion of each compartment. A plate forming a ledge 17 connects the outer wall 18 of the narrow space at the top thereof with the outer walls 14 of the larger space at the bottom thereof. The ledge 17 is stepped up at 19 between compartments 6 and 7 and between compartments 7 and 8. The walls of the narrow spaces 15 are substantially concentric with the casings 13 of the ice cream compartments 6, 7, 8 and 10. The larger spaces 16 have a common outer wall 14, which may be the inner wall of the receptacle, and inner walls formed by the compartment casings 13. The narrow spaces are substantially uniform in width, but the larger spaces are irregular because of the rectangular outer wall and the curved inner walls. All of the narrow spaces are connected at the top with the combined larger spaces, but they are separate from each other. Covers 20 are provided for the compartments.

To provide a uniform refrigeration of all the ice cream in the refrigerator, regardless of the distance of any compartment from the boiler, and consequent variation in temperature of the brine, I make the lower narrow brine space relatively high for the compartment nearest the boiler and progressively lower to the farthest compartment. The upper larger brine space will be comparatively short for the nearest compartment and progressively deeper to the farthest compartment. Thus the nearest compartment is surrounded with a thin film-like body of brine to a considerable height and above this with a larger body of brine, the film-like body is not so high for the next compartment and the larger body is deeper, and so on, the larger body of greater volume of brine increasing and the narrow body of restricted volume of brine decreasing in area of contact with the receptacles progressively from the receptacle nearest the boiler outward. Thus the brine is distributed in varying volume about the upper portion of the cans where refrigeration is most effective, and in restricted volume about the lower portion of the cans to insure complete and uniform refrigeration.

I have described the invention as used for refrigerating ice cream but it may be used for any other products for which it is or may be adapted.

I am aware that changes in the form, construction, proportions and arrangement of parts of the invention may be made to satisfy various conditions and without departing from the invention, and I reserve the right to make all such changes as fall within the scope of the following claims:

I claim:

1. An ice cream refrigerator comprising a receptable, a plurality of compartments in the receptacle to receive the ice cream, a source of supply for the refrigerating medium, and means for confining a relatively thin body of refrigerating medium around the lower portion and a larger body of refrigerating medium around the upper portion of each compartment, the height of the thin body decreasing and of the larger body increasing from the compartment nearest to the source of supply of refrigerating medium to the compartment farthest removed therefrom.

2. An ice cream refrigerator comprising a liquid-tight compartment adapted to receive a can of ice cream, and means for confining and sealing from the compartment a relatively thin body of refrigerating medium outside of and around the lower portion of the compartment and a larger body of refrigerating medium outside of and around the upper portion of the compartment.

3. An ice cream refrigerator comprising a liquid-tight refrigerant casing having an inner and an outer wall, the inner wall forming a compartment adapted to receive a can of ice cream and the outer wall being spaced close to the lower portion of the inner wall and farther from the upper portion of the outer wall to confine a relatively small film-like volume of refrigerant around the lower portion and a larger volume of refrigerant around the upper portion of the compartment.

4. An ice cream refrigerator comprising a liquid-tight refrigerant casing having an inner and an outer wall, the inner wall forming a compartment adapted to receive a can of ice cream, the lower portion of the outer wall being spaced close to the inner wall and the upper portion of the outer wall being spaced farther from the inner wall than said lower portion, and a plate connecting the upper edge of the lower portion and the lower edge of the upper portion of said outer wall.

5. An ice cream refrigerator comprising a receptacle, a liquid-tight refrigerant casing in the receptacle having inner and outer walls, the inner walls forming a plurality of separate compartments adapted to receive cans of ice cream, a source of refrigerant in the receptacle communicating with said compartments, the lower portion of said inner walls being located relatively close to the lower portions of said compartments and the upper portion of said inner walls being spaced farther from the compartments than the lower portion of said inner walls, and a ledge between the lower portion and the upper portion of said inner walls, said ledge being stepped down from the compartment nearest the source of refrigerant to the compartment farthest from the source of refrigerant.

CHARLES L. BASTIAN.